(12) United States Patent
Kolb

(10) Patent No.: US 11,204,424 B2
(45) Date of Patent: Dec. 21, 2021

(54) METHOD FOR CAPTURING A 3D SCENE BY MEANS OF A LIDAR SYSTEM AND A LIDAR SYSTEM FOR THIS PURPOSE

(71) Applicant: Jena-Optonik GmbH, Jena (DE)

(72) Inventor: Florian Kolb, Jena (DE)

(73) Assignee: Jena-Optronik GmbH, Jena (DE)

( * ) Notice: Subject to any disclaimer, the term of this patent is extended or adjusted under 35 U.S.C. 154(b) by 453 days.

(21) Appl. No.: 15/838,896

(22) Filed: Dec. 12, 2017

(65) Prior Publication Data

US 2018/0172834 A1 Jun. 21, 2018

(30) Foreign Application Priority Data

Dec. 16, 2016 (DE) ...................... 10 2016 124 594.1

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4814* (2013.01); *G01S 7/4816* (2013.01);
(Continued)

(58) Field of Classification Search
None
See application file for complete search history.

(56) References Cited

U.S. PATENT DOCUMENTS

2003/0058455 A1* 3/2003 Ebihara ................ G01B 11/007
356/601
2003/0230705 A1* 12/2003 Stephan ............... B60Q 1/1423
250/214 VT
(Continued)

FOREIGN PATENT DOCUMENTS

AT 505037 B1 10/2008
DE 10146752 A1 4/2002
(Continued)

OTHER PUBLICATIONS

Mitev et al.; Publication entitled Performance Modelling of Miniaturized Flash-Imaging LIDARs for Future Mars Exploration Missions; 9 pages.
(Continued)

*Primary Examiner* — Hovhannes Baghdasaryan
(74) *Attorney, Agent, or Firm* — Dorton & Willis, LLP

(57) ABSTRACT

A 3D scene is acquired using a LIDAR system including a transmitter, a receiver, and a pivotable mirror arrangement between the transmitter and the 3D scene. The transmitter is operated as a laser light source and the receiver is configured as a matrix sensor with an irradiation optical system and light sensors distributed over a surface. Light points reflected in a spatially resolved manner at pixels of a point cloud of the 3D scene are generated by light pulses of the transmitter and by pivoting the mirror arrangement. An input signal is acquired from each of the light points by the light sensors and a distance of the light points to the matrix sensor is determined based on a light propagation time measurement. A defocused input signal of a light point including a plurality of light sensors is displayed by the irradiation optical system and the input signals are compared.

10 Claims, 1 Drawing Sheet

(51) Int. Cl.
*G01S 7/4865* (2020.01)
*G01S 7/4863* (2020.01)
*G01S 17/42* (2006.01)

(52) U.S. Cl.
CPC .......... *G01S 7/4817* (2013.01); *G01S 7/4863* (2013.01); *G01S 7/4865* (2013.01); *G01S 17/42* (2013.01)

(56) References Cited

U.S. PATENT DOCUMENTS

| | | | | |
|---|---|---|---|---|
| 2006/0284050 A1* | 12/2006 | Busse | ................. | G01S 5/16 250/203.1 |
| 2010/0092043 A1* | 4/2010 | Borman | ................. | G06T 7/20 382/107 |
| 2012/0027290 A1* | 2/2012 | Baheti | ................. | G06K 9/4671 382/154 |
| 2014/0300701 A1* | 10/2014 | Park | ................. | G06T 5/003 348/46 |
| 2015/0003741 A1* | 1/2015 | Zhang | ................. | G06T 7/33 382/199 |
| 2015/0041625 A1 | 2/2015 | Dutton et al. | | |
| 2016/0178433 A1* | 6/2016 | Aphek | ................. | G01J 1/1626 250/338.1 |
| 2016/0268331 A1 | 9/2016 | Parmesan | | |
| 2016/0356890 A1* | 12/2016 | Fried | ................. | G01S 17/42 |
| 2017/0001736 A1* | 1/2017 | Kolb | ................. | B64G 1/62 |
| 2018/0068424 A1* | 3/2018 | Kwon | ................. | G01S 7/493 |
| 2018/0137318 A1* | 5/2018 | Canini | ................. | G06K 7/1465 |
| 2018/0374230 A1* | 12/2018 | Narasimhan | ......... | H04N 13/207 |

FOREIGN PATENT DOCUMENTS

| | | |
|---|---|---|
| DE | 10118183 B4 | 6/2005 |
| DE | 202013101039 U1 | 3/2014 |
| DE | 202014007924 U9 | 5/2015 |
| EP | 2708913 A1 | 3/2014 |
| JP | 2014059302 A * | 4/2014 ........... G01S 7/4817 |

OTHER PUBLICATIONS

European Patent Office; Search Report in European Patent Application No. 17 207 231.6 dated May 3, 2018; 8 pages.
European Patent Office; Office Action in related European Patent Application No. 17 207 231.6 dated Oct. 1, 2020; 6 pages.

* cited by examiner

METHOD FOR CAPTURING A 3D SCENE BY MEANS OF A LIDAR SYSTEM AND A LIDAR SYSTEM FOR THIS PURPOSE

CROSS-REFERENCE TO RELATED APPLICATIONS

This application claims the benefit of priority under 35 U.S.C. § 119(a) to German Patent Application DE 10 2016 124 594.1, filed Dec. 16, 2016 (pending), the disclosure of which is hereby incorporated by reference in its entirety.

TECHNICAL FIELD

The invention relates to a method for acquiring a 3D scene by means of a LIDAR system, including a transmitter and a receiver as well as a pivotable mirror arrangement disposed between the transmitter and the 3D scene, wherein the transmitter is operated as a laser light source and the receiver is configured as a matrix sensor with an irradiation optical system and light sensors distributed over a surface, wherein light points reflected in a spatially resolved manner at pixels of a point cloud of the 3D scene are generated by means of light pulses of the transmitter and with a pivoting the mirror arrangement, and an input signal is acquired from each of these light points by the light sensors and a distance of the light points to the matrix sensor is determined on the basis of a light propagation time measurement.

BACKGROUND

In order to record a 3D scene in the form of a three-dimensional point cloud with pixels, in principle three different elements are required in a LIDAR system:
a) an element for determining the distance to a selected pixel,
b) an element for selecting a pixel within the 3D scene,
c) a (laser) light source.

Two different methods are frequently used to determine the distance: A method using a modulated laser light source and utilizing phase effects (e.g. photonic mixing device, PMD), for example, or a method for determining a light propagation time measurement (time of flight, TOF) of a laser pulse.

As is known from AT 505 037 B1, for example, the selection of a pixel within the 3D scene can be performed using a LIDAR system with a scanning device, in which point-for-point scanning is provided by means of a mirror system including moving deflection mirrors (scanning system). In doing so, each light point of the point cloud is displayed on a single sensor, for example a photodiode, and the propagation time or phase effect thereof is evaluated.

Alternatively, using a LIDAR system, a 3D scene can be sharply projected onto a sensor array with a plurality of light sensors laterally distributed on a sensor surface of the sensor array by means of an upstream optical system, wherein the spatial resolution is performed on the basis of the distribution of the displayed light points on the correspondingly positioned light sensors and the distance of the pixels of the 3D scene from a subsequent time measurement function or phase evaluation is determined for each individual light sensor and pixel. In doing so, the elements for determining the distance to a selected pixel and the elements for selecting a pixel within the 3D scene coincide.

Different laser light sources are used, depending on the design of the LIDAR system. A LIDAR system with such a scanning device typically comprises a laser light source with one pulsed individual laser beam, whereby the pulses are moved over the 3D scene with the aid of a mirror system. The scanning, for example the rasterization, of the 3D scene is thus carried out by means of the mirror system. In contrast, in the case of a LIDAR sensor with a sensor array, the laser light source, for example a flash LIDAR or a 3D camera, illuminates the entire 3D scene at once. The rasterization of the 3D scene is performed by means of the sensor array.

Due to the mirror system being used and because the deflection and the velocity are variable, the LIDAR system with the scanning device can generally perform any rasterization of the 3D scene. Since a single laser pulse is required for each distance measurement, the laser used must have a sufficiently high pulse repetition rate, for example in the range of several kHz. Since only one transmitting and detecting channel is provided, complex time measuring electronics with high resolution and accuracy can be used. The moving masses of the mechanical mirror system limit the velocity of the LIDAR system. This is problematic in particular if, due to the large range requirement of the LIDAR system and the resulting large reception optics of the mirror system, correspondingly large masses are required. Due to the low measurement repetition rate of a LIDAR system based on the single sensor, for rapidly moving objects, a distortion can occur within an image of the 3D scene as a result of the object's own movement. The mechanical mirror system is furthermore subject to wear. The use of a small and quick mirror system, for example a micromirror or a micromirror array, for the scanning device, and a then necessary light-collecting optical system for the entire field of view, is technically not possible on the single sensor, because only minimal transmissions are obtained for such optics.

A LIDAR system with a sensor array and a so-called flash laser light source is known, for example, from "Performance modeling of miniaturized flash-imaging lidars for future Mars exploration missions", Alexandre Pollini, Jacques Haesler, Valentin Mitev, João Pereira do Carmo, Paper 66403, International Conference on Space Optics 2014. In contrast to LIDAR systems with a scanning device, LIDAR systems with a sensor array do not comprise any movable parts, because both the scanning and the rasterization of the 3D scene is performed by means of the spatially resolved evaluation of the light sensors of the sensor array. The possible image refresh rate can be significantly higher than that of scanning LIDAR systems and is generally limited by the output of the laser light source and, in order to ensure the unambiguity of the distance measurement, by the distance of the object to be acquired by means of the 3D scene. LIDAR systems of this type have to illuminate the entire 3D scene at once, thus necessitating a pulse energy that is several orders of magnitude greater than that of a scanning LIDAR system. The necessary pulse energies therefore represent a general limitation for laser light sources, because the optical energy of the light pulse has to be stored, and the used optical elements have to tolerate high pulse peak outputs. In addition, the spatial resolution is limited by the number of pixels in the sensor array. The temporal resolution of these LIDAR systems is typically poorer than that of scanning LIDAR systems, because individual time-measuring electronics are required for each light sensor.

SUMMARY

The object of the invention is to propose a method for acquiring a 3D scene by means of a LIDAR system. The object of the invention is furthermore to propose a LIDAR system for acquiring a 3D scene. The intent is in particular to propose a simpler or improved acquisition of the 3D scene by means of the method and the LIDAR system. In particular, the resolution and/or the operating speed of the LIDAR system should be improved.

The proposed method is used to acquire a 3D scene by means of a LIDAR system. 3D scenes in terrestrial applications and in the aerospace industry, in particular, can be acquired by means of the method. These are terrestrial objects such as vehicles, pedestrians and obstacles in the field of automobile use, ships, buildings, objects, animals and plants; in the field of aviation these are any flying objects, as well as surfaces of extra-terrestrial space objects such as, planets, moons, asteroids and the like, or spacecraft such as space stations, spacecraft, satellites and the like.

The LIDAR system provided for the proposed method includes a transmitter and a receiver as well as a pivotable mirror arrangement disposed between the transmitter and the 3D scene, for example with a macroscopic mirror, a miniaturized mirror, an array of mirrors, preferably micromirrors, or a mirror device manufactured in accordance with MEMS methods (micro-electromechanical, microelectromechanical or microelectronic and microelectromechanical systems and the related micromechatronics). The mirror device can be configured to be controllable, for example, by means of a solid body joint. The mirror arrangement configured in this way corresponds to a scanning device of the 3D scene and, for this purpose, for example for both scanning and rasterization of the 3D scene, can be pivotable in azimuth and elevation direction. Corresponding angles of inclination are acquired and define a respective predetermined pixel of the 3D scene irradiated by a laser light source. A laser light source, which can be operated in a pulsed or modulated manner, serves as the transmitter.

The receiver is set up as a matrix sensor, for example a sensor array with a plurality of light sensors laterally distributed over a surface such as a sensor surface, on which the light pulses reflected by the individual pixels are displayed by an irradiation optical system integrated into the beam path. As a result of the pivoting of the mirror arrangement, by approaching the individual pixels and the reflection of the light pulses of the laser light pulses impinging on these pixels, a point cloud of the 3D scene is generated and, for each pixel, a light point reflected by said pixel is generated in a spatially resolved manner. An input signal is acquired by the light sensors from each light point, optionally likewise in a spatially resolved manner, and a distance of the light points of the point cloud to the matrix sensor is determined on the basis of a light propagation time measurement. The invention proposes to do without a sharp image of the light pulses and instead to respectively display a defocused input signal of a light pulse comprising a plurality of light sensors by means of the irradiation optical system. The input signals of adjacent light sensors are compared to one another. As a result of the defocused light points, a plurality of adjacent light sensors acquire this light point with varying intensity, so that, by using appropriate algorithms to compare the intensities and/or propagation times of the light points acquired by the respective light sensors to one another, issues such as noise of the light sensors, allowances for the propagation time measurement and the like can be eliminated. Alternatively or additionally, by means of averaging, establishing a center point or similar, it is possible to achieve a spatial resolution of the incident intensity of a light point that is below the spatial resolution predetermined by the number of light sensors on the surface of the matrix sensor (subpixel resolution). Alternatively or additionally, by evaluating the ratios of the light sensors among one another, a degradation of the transmitter, for example the matrix sensor and/or the laser light source, that sets in over the course of the operating time of the LIDAR system, can be identified.

With the aid of the proposed method, the LIDAR system can be operated from the outside for long periods of time without requiring maintenance, and is particularly well-suited for extraterrestrial applications in which there is no possibility of access. In particular, with the proposed method, the LIDAR system can be designed to be continuously self-calibrating and self-adapting.

According to an advantageous embodiment of the method, a spatial allocation of a respective light point in the 3D scene can be determined on the basis of a radiation angle of the light pulses at the mirror arrangement. For example, the radiation angle can be determined on the basis of a position of a deflecting device of the mirror arrangement. For this purpose, these LIDAR systems comprise a mirror arrangement with a commensurate beam angle acquisition device, which is in signal connection with the receiver, so that the transmitter and the receiver are synchronized with one another with respect to the temporal and spatial allocation of the output signals of the laser light source and the input signals of the matrix sensor. The control and synchronization of the transmitter and the receiver can be provided for in the transmitter or in the receiver or in a superordinate control device.

According to an advantageous embodiment of the proposed method, propagation time differences of a respective light point acquired by a plurality of light sensors are compared to one another and evaluated. By evaluating the individual propagation times per light sensor, for example, ongoing fluctuations and deviations of the propagation times can be weighed against one another. A time measurement of the entire LIDAR system or individual light sensors, for example, can be corrected by means of the comparison of the propagation time differences. Time measuring devices deviating beyond a predetermined extent, for example, can be calibrated by adding appropriately adjustable correction terms or coefficients to the relevant measurement algorithms, for example, and continuously updating them.

The recorded light intensities of a respective light point acquired by a plurality of light sensors can alternatively or additionally be compared with one another. For example, a center point of greatest light intensity can be determined from the light intensities of the light sensors, independently of the lateral resolution of the light sensors. The sensitivity of the individual light sensors, for example, can be calibrated and adapted by correlating the acquired input signals. In a particularly advantageous manner, noise suppression can be provided by means of the light intensities of the light sensors. Statistical noise, which occurs differently at different light sensors, can hereby be eliminated in a particularly advantageous manner. An evaluation of the noise occurring at the respective light sensors can be considered as a function of the light intensities, which occur differently at the respective light sensors.

The proposed LIDAR system is used to implement the proposed method and includes at least one transmitter that emits light pulses, a pivotable mirror arrangement with a deflecting device, which sets and acquires a radiation angle of the light pulses. Also provided is a receiver for receiving the light points emitted by the transmitter and reflected at the pixels of a point cloud of a 3D scene. The receiver includes a matrix sensor with a plurality of light sensors disposed on a surface, for example in a plane, and an irradiation optical system, which projects the light points onto the matrix sensor in a defocused manner. The irradiation optical system can be provided to be adjustable, so that the degree of defocusing can be adjusted.

In other words, proceeding from a scanning LIDAR system according to the prior art, a miniaturized scanning device in the form of a mirror arrangement is provided. Due to the small dimensions of the mirror arrangement, in particular the mirror arrangement, smaller inertial forces are needed for deflection, so that said mirror arrangement can be pivoted quickly. In addition, a matrix sensor instead of a single sensor is provided as the receiver. The receiver includes an incorporated time measurement. Improved resolution with respect to the propagation time and the spatial resolution can consequently be proposed as follows:

The determination of the deflection of the mirror arrangement allows an increase of the spatial resolution (x-y, elevation-azimuth). For the proposed mirror arrangement, due to its low inertia, the deflection, i.e. the actual value, can substantially be equated with the set angle size, i.e. the target value. The deflection of the mirror arrangement can furthermore be measured, i.e. the actual value can be determined, for example, by providing an optical deflection determination or a capacitive deflection determination.

The defocusing of the irradiation optical system for the matrix sensor, such as a single photon image sensor instead of a sharp image on a single sensor, for example, has the advantage that, as a result of the defocusing, a light point reflected on a pixel of the point cloud of a 3D scene impinges on a plurality of light sensors and image sensors. The mirror arrangement can be guided over the 3D scene in a predetermined pattern, for example controlled by a data acquisition device, a control device or the like. Laser pulses with repetition rates in the range of several kHz to MHz, for example, are generated by means of the laser light source. The position of the mirror arrangement is recorded and stored by an internal data processing system.

A reading and processing of input signals of individual light sensors of the matrix sensor, including the surrounding light sensors resulting from the defocusing, for example, can be limited to light sensors that correspond to the position of the mirror arrangement in a spatially resolved manner. These or all acquired input signals of the light sensors are read and recorded and stored in the internal data processing device. The time values for the light pulses acquired in the corresponding light sensors and recorded in the individual light sensors can be combined to one temporal histogram. An exact distance between a pixel and the matrix sensor can be determined from the maximum of the histogram. An exact spatial position of a pixel can be determined on the basis of the deflection of the mirror arrangement, or alternatively by means of a subpixel-accurate determination of a center point of the signal intensities of the irradiated light sensors. The two options can be combined with one another for further improvement of the spatial resolution and/or to perform plausibility assessments.

A possibly existing constraint on a distance resolution using a limited time measurement of the individual light sensors of the matrix sensor can be counteracted, if necessary, by combining and statistically evaluating the input signals of a plurality of light sensors. Incorrect acquisition of input signals at light sensors as a result of an interfering background light can be ruled out, because only those light sensors are evaluated, which are affected as a function of the adjusted deflection of the mirror arrangement and correspondingly affected by light points backscattered by the pixels of a point cloud of the 3D scene. In addition, with the aid of a statistical evaluation of the defocused input signals at the corresponding light sensors, which can be attributed to a light point, the effect of erroneous triggering, and with it noise, can be reduced. Depending on the degree of defocusing, the LIDAR system can be configured to provide higher accuracy and less noise with greater defocusing, or higher sensitivity with reduced defocusing.

BRIEF DESCRIPTION OF THE DRAWINGS

The invention is explained in more detail with reference to the design example shown in FIGS. 1 to 3.

DETAILED DESCRIPTION

Figure 1:
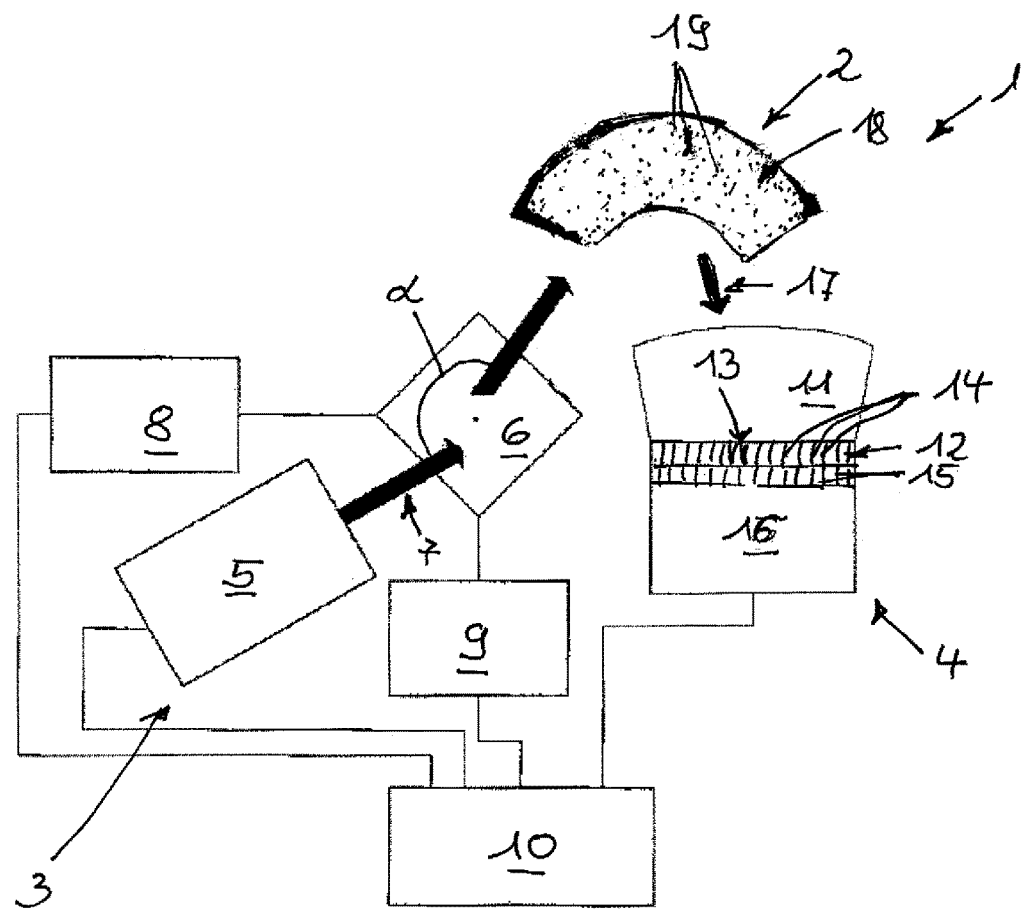
FIG. 1 depicts a LIDAR system in a systematic representation.

FIG. 1 shows a schematic representation of the LIDAR system 1 for acquiring the 3D scene 2 by means of the transmitter 3 and the receiver 4.

The transmitter 3 includes the laser light source 5. The laser light source 5 emits pulsed or modulated light pulses 7, which are directed onto the mirror arrangement 6, for example a micromirror arrangement or a micromirror array arrangement. The mirror arrangement 6 can be controlled in two directions of deflection, i.e. in y-direction and x-direction, or in elevation and azimuth direction. The two deflecting devices 8, 9, which respectively specify a predetermined deflection angle for setting a radiation angle α, are provided for this purpose. The deflection angles and the output times of the light pulses 7 are transmitted to the data processing device 10 and stored.

The receiver 4 includes the irradiation optical system 11 and the matrix sensor 12 with a plurality of light sensors 14, which are effectively laterally distributed on the surface 13. Each light sensor 14 has a sensitivity and time measurement device 15, the input signals of which are acquired by the acquisition device 16 and transmitted to the data processing device 10.

The light pulses 7 are directed onto pixels 19 of the 3D scene 2 in a temporal sequence as a function of the deflection of the mirror arrangement 6, and there generate a point cloud 18 consisting of reflected light points 17. The light points 17 impinge upon the irradiation optical system 11 of the receiver 4 in a temporally offset manner. The irradiation optical system 11 emits a light point 17 generated from one respective light pulse 7 by reflection at a pixel 19 of the point cloud 18 onto the surface 13 in a defocused manner, so that a plurality of adjacent light sensors 14 receive an input signal of the light point 17. For each light point 17, the corresponding input signals are stored in the data processing device 10 and compared with the associated light pulse in a time-synchronous manner. The distance from the corresponding pixel of the point cloud and the surface 13 or the like is determined from the propagation time (time of fly, TOF) of the light pulse 7 and the associated light point 17, so that a three-dimensional shape of the 3D scene 2 can be calculated via the determined light points 17.

In a preferred manner, only light sensors 14 are evaluated, which correlate with the corresponding light pulse 7 of the corresponding radiation angle of the mirror arrangement 6. Statistical dispersion of the time measuring devices of the individual light sensors 14 is eliminated from the statistical evaluation of the input signals of a light point 17. A subpixel resolution of the matrix sensor 12 can additionally be achieved, by analyzing a statistical evaluation of the signal intensities of the input signals of the light sensors 14. The deflecting devices 8, 9 can optionally be checked and, if necessary, corrected via the acquisition of the imaging position of a corresponding number of light points 17. Via the statistical evaluation of the signal intensities of the input signals of a light point 17, the noise of the individual light sensors 14 can be identified and, if necessary, corrected, or the noise can be eliminated or its influence on the input signals can at least be reduced.

Figure 2:
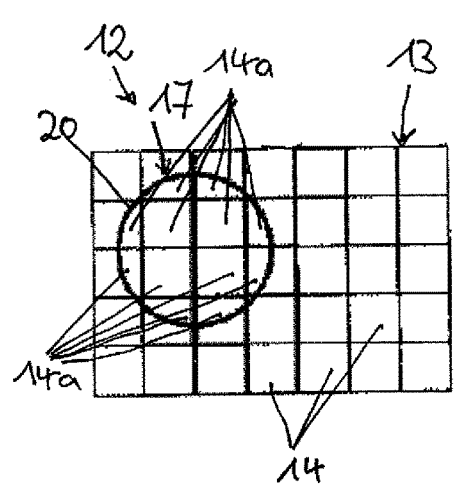
FIG. 2 depicts the surface of the matrix sensor of FIG. 1.

FIG. 2 shows the surface 13 of the matrix sensor 12 of the LIDAR system 1 of FIG. 1 in a schematic representation and, for the sake of clarity, a small number of light sensors 14. The circle 20 depicted on the surface 13 represents a light point 17 defocused by the irradiation optical system 11 (FIG. 1), so that input signals are respectively acquired at the light sensors 14a. Via the comparison of the arrival times of the input signals of the light sensors 14a among one another and with the start time of the light pulse of the laser light source underlying the light point 17, an average can be taken across the different propagation times and an error in the time deviation of the time measurements of the individual light sensors 14a can be averaged, thus allowing the distance measurement between the 3D scene and the receiver to be improved.

Figure 3:
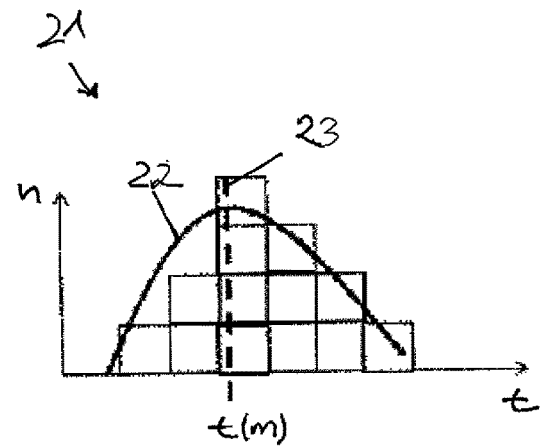
FIG. 3 is a diagram for evaluating input signals impinging on a plurality of light sensors.

FIG. 3 shows a time distribution of the individual light sensors 14a of FIG. 2 as a diagram 21 with the number n of input signals over the time t. The curve 22 represents the time distribution of the input signals and the dashed line 23 represents the mean value t(m) of the propagation time of the input signals.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMBERS

1 LIDAR system
2 3D scene
3 Transmitter
4 Receiver
5 Laser light source
6 Mirror arrangement
7 Light pulse
8 Deflecting device
9 Deflecting device
10 Data processing device
11 irradiation optical system
12 Matrix sensor
13 Surface
14 Light sensor
14a Light sensor
15 Sensitivity and time measuring device
16 Acquisition device
17 Light point
18 Point cloud
19 Pixel
20 Circle
21 Diagram
22 Curve
23 Line
n Number
t Time
t(m) Mean value
π Radiation angle

What is claimed is:

1. A method for acquiring a 3D scene using a LIDAR system, the LIDAR system including a transmitter, a receiver, and a pivotable mirror arrangement disposed between the transmitter and the 3D scene, wherein the transmitter is operated as a laser light source and the receiver is configured as a matrix sensor with an irradiation optical system and light sensors distributed over a surface, the method comprising:

generating light points by pulsing light from the transmitter and pivoting the mirror arrangement, wherein the light points correspond to the reflection of the pulsed light reflected in a spatially resolved manner at pixels of a point cloud of the 3D scene;

acquiring an input signal from each of the light points using the light sensors;

determining a distance of the light points to the matrix sensor on the basis of a light propagation time measurement;

displaying with the irradiation optical system a defocused input signal of a light point comprising a plurality of light sensors;

comparing the input signals of adjacent light sensors to one another;

comparing non-zero light intensities of a respective light point acquired by a plurality of light sensors to one another; and combining time values for the light pulses acquired in the plurality of light sensors into a temporal histogram;

wherein the distance between the light points and the matrix sensor is determined from a maximum of the histogram.

2. The method of claim 1, further comprising determining a spatial allocation of a respective light point in the 3D scene on the basis of a radiation angle of the light pulses on the mirror arrangement.

3. The method of claim 2, further comprising determining the radiation angle on the basis of a position of a deflecting device of the mirror arrangement.

4. The method of claim 1, further comprising comparing and evaluating propagation time differences of a respective light point acquired by a plurality of light sensors.

5. The method of claim 4, further comprising correcting a time measurement of the LIDAR system by the comparison of the propagation time differences.

6. The method of claim 1, further comprising determining a center point of greatest light intensity from the light intensities of the light sensors independent of a lateral resolution of the light sensors.

7. The method of claim 1, further comprising reducing noise of the light sensors using the light intensities of the light points impinging on the light sensors.

8. The method of claim 7, wherein reducing noise of the light sensors is based on differences in light intensity determined from comparing the light intensities of a respective light point acquired by the plurality of light sensors.

9. A LIDAR system for acquiring a 3D scene, the LIDAR system comprising:
- a transmitter that emits light pulses;
- a pivotable mirror arrangement with a deflecting device which sets and acquires a radiation angle of the light pulses;
- a receiver configured as a matrix sensor and comprising a plurality of light sensors distributed laterally on a surface; and
- an irradiation optical system which projects the light points reflected by the pixels of a point cloud onto the surface of the matrix sensor in a defocused manner;
- the LIDAR system operable to acquire a 3D scene according to the method of claim 1.

10. The LIDAR system of claim 9, wherein the degree of defocusing is adjustable.

* * * * *